July 26, 1932.   A. F. SCHOEN   1,868,995
ANTIGLARE DEVICE FOR AUTOMOBILE HEADLIGHTS
Filed May 22, 1931
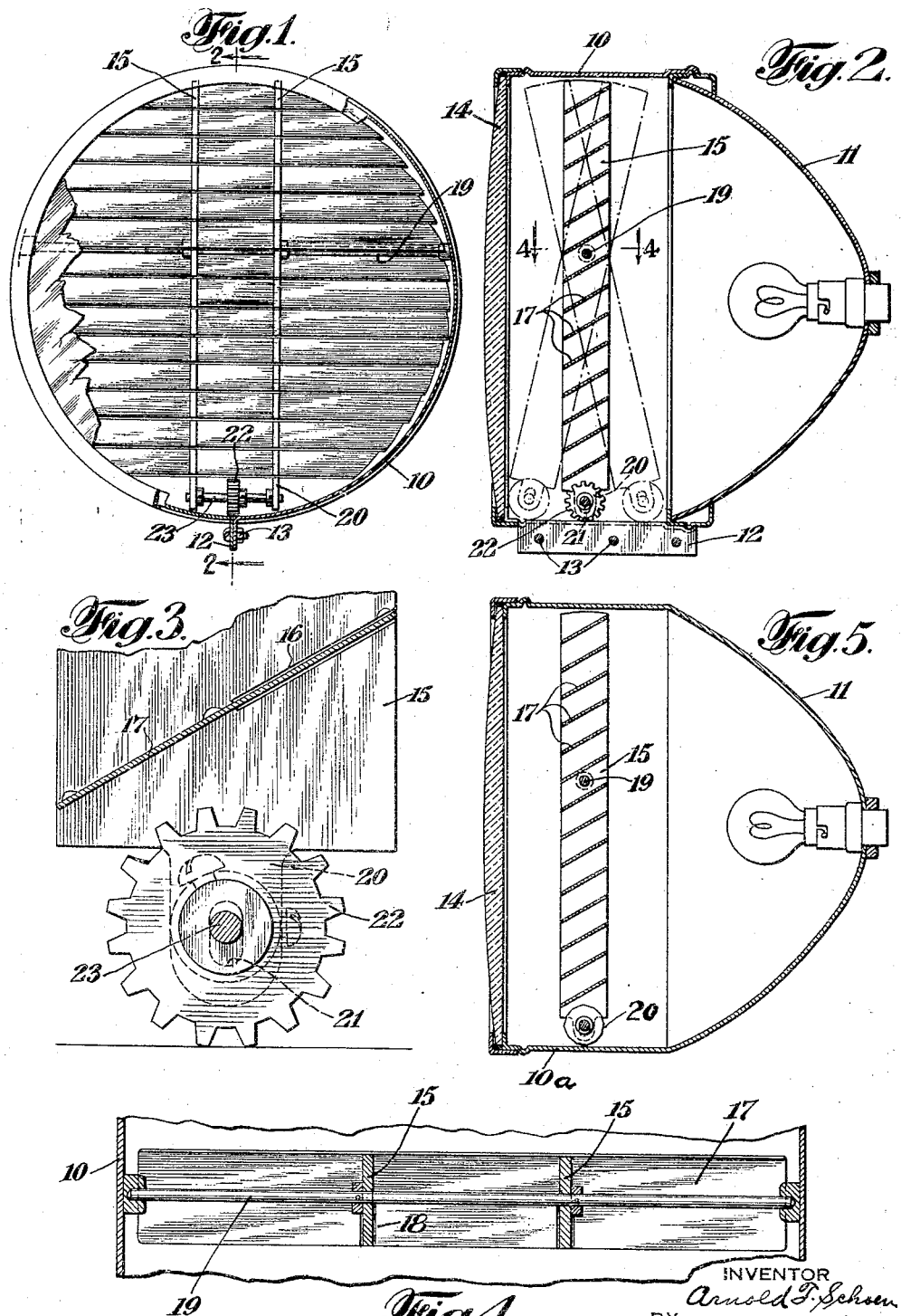
INVENTOR
Arnold F. Schoen
BY Kenyon & Kenyon
ATTORNEYS.

Patented July 26, 1932

1,868,995

UNITED STATES PATENT OFFICE

ARNOLD F. SCHOEN, OF SAUGERTIES, NEW YORK

ANTIGLARE DEVICE FOR AUTOMOBILE HEADLIGHTS

Application filed May 22, 1931. Serial No. 539,168.

This invention relates to light controlling devices and more especially to anti-glare devices for automobile headlights.

An object of this invention is an anti-glare device for automobile headlights adapted to deflect light forwardly and downwardly, thereby eliminating the blinding glare objectionable to pedestrians or occupants of other automobiles in combination with means for automatically varying the amount of deflection when the automobile encounters an up or down grade.

A device embodying the invention comprises a frame having a plurality of oblique shutter slats fixed thereto and being pivotally supported within a casing above its center of gravity so that the frame tends to remain vertical irrespective of the position assumed by the casing. A broken surface roller is rotatably carried by the lower end of the frame for contact with the casing for the purpose of preventing fluctuation of the frame when the wheels of the automobile encounter slight irregularities in the road or the automobile is otherwise caused to tilt slightly while running on a substantially level road.

Other objects, novel features and advantages of this invention will be apparent from the following specification and accompanying drawing, wherein:

Fig. 1 is a front elevation of an attachment for automobile headlights;

Fig. 2 is a section on the line 2—2 of Fig. 1, with the device attached to an automobile headlight;

Fig. 3 is an enlarged fragmentary section similar to Fig. 2;

Fig. 4 is a section on the line 4—4 of Fig. 2, and

Fig. 5 is a vertical section through a headlight embodying the invention.

Referring now more especially to Figs. 1 to 4 inclusive, 10 is a split cylindrical casing adapted to encircle the housing of an automobile headlight 11 and being provided with flanges 12 through which extend bolts 13, by means of which the casing is clamped to the housing. The casing 10 at its front end is provided with means for attaching the headlight lens 14 which is removed from the headlight 11 and placed in the position shown in Fig. 2 when the anti-glare device is mounted on a headlight.

Within the casing there is provided a frame consisting of a pair of bars 15, each being provided with a plurality of oblique slots 16. A plurality of shutter slats 17 provided with slots 18 to receive the bars 15 are arranged in the slots 16 and are fixed to the bars 15 preferably by welding. A rod 19 arranged above the center of gravity of the frame 15 pivotally supports the latter in stable equilibrium so that the frame tends to remain vertical irrespective of tilting movement of the casing 10. The bars 15 are provided with lugs 20 having elongated vertical slots 21. A weighted broken surface roller 22 has pintles 23 arranged in the slots 21. The slots 21 are of such length and the roller 22 of such diameter that the roller remains in contact with the wall of the casing 10 in any position assumed by the frame. This roller acts as a drag to prevent fluctuation of the frame when the automobile encounters slight irregularities in a substantially level road and permits tilting of the frame only after a predetermined degree of angularity of the casing has been obtained.

Fig. 5 illustrates an automobile headlight in which the anti-glare device is an integral part. In this embodiment, the headlight casing is provided with an integral flange 10a within which the frame and shutter slats described in connection with Figs. 1 to 4 are contained. The operation of this embodiment is identical with that previously described.

It is of course understood that various modifications may be made in the device above described, without in any way departing from the spirit of the invention as defined in the appended claims.

I claim:

1. A device of the character described comprising a casing, a frame pivotally supported in said casing in stable equilibrium but adapted to swing freely when the casing is tilted, a plurality of shutter slats fixed to said frame, and a broken surface roller rotatably supported by said frame in engagement with said casing for damping swinging movement of said frame.

2. In a device of the character described, a casing, a frame pivotally supported within said casing in stable equilibrium but adapted to swing freely when the casing is tilted, a plurality of shutter slats fixed to said frame, and a broken surface roller rotatably supported by said frame in engagement with said casing for damping swinging movement of the frame, said roller being capable of reciprocatory movement relative to said frame.

3. In a device of the character described, a casing, a frame pivotally supported in said casing in stable equilibrium but adapted to swing freely when the casing is tilted, a plurality of shutter slats fixed to said frame, lugs extending from said frame and having elongated slots, and a broken surface roller having pintles extending into said slots, said roller being in engagement with said casing for damping swinging movement of said frame.

In testimony whereof, I have signed my name to this specification.

ARNOLD F. SCHOEN.